(12) United States Patent
Hedin

(10) Patent No.: US 11,648,601 B2
(45) Date of Patent: May 16, 2023

(54) SHEET METAL PRESS SYSTEM AND METHOD USED IN CONNECTION THEREWITH

(71) Applicant: Hedin Lagan AB, Lagan (SE)

(72) Inventor: Kenneth Hedin, Lagan (SE)

(73) Assignee: HEDIN LAGAN AB, Lagan (SE)

( * ) Notice: Subject to any disclaimer, the term of this patent is extended or adjusted under 35 U.S.C. 154(b) by 362 days.

(21) Appl. No.: 16/956,673

(22) PCT Filed: Dec. 12, 2018

(86) PCT No.: PCT/EP2018/084622
§ 371 (c)(1),
(2) Date: Jun. 22, 2020

(87) PCT Pub. No.: WO2019/121260
PCT Pub. Date: Jun. 27, 2019

(65) Prior Publication Data
US 2020/0316669 A1    Oct. 8, 2020

(30) Foreign Application Priority Data

Dec. 22, 2017 (SE) .................................. 1751632-9

(51) Int. Cl.
*B21D 37/04* (2006.01)
*B21D 37/14* (2006.01)
(Continued)

(52) U.S. Cl.
CPC ........... *B21D 37/04* (2013.01); *B21D 37/147* (2013.01); *B21D 43/05* (2013.01);
(Continued)

(58) Field of Classification Search
CPC .. B30B 15/028; B23Q 3/15573; B23Q 3/155; B23Q 3/15513; B23Q 3/1554; B21D 37/14; B21D 37/147
See application file for complete search history.

(56) References Cited

U.S. PATENT DOCUMENTS 3,234,648 A * 2/1966 Knowles ................. B21J 13/085
483/58
4,078,409 A * 3/1978 Bronin .................... B21D 22/12
72/453.01
(Continued)

FOREIGN PATENT DOCUMENTS

DE    3620964 A * 1/1988 ............. B21D 37/14
EP    2441534 A1    4/2012
JP    6137329 A    2/1986

OTHER PUBLICATIONS

Wissner, Translation of DE-3620964-A (Year: 1988).*
(Continued)

*Primary Examiner* — Jason Skaarup
*Assistant Examiner* — Bobby Yeonjin Kim
(74) *Attorney, Agent, or Firm* — Shih IP Law Group, PLLC

(57) ABSTRACT

The invention concerns a sheet metal press system and a method used in connection therewith. The sheet metal press system comprises at least one sheet metal press having an opening through which a tool, which comprises an upper die, a lower die and a tool changer interface, can pass during a tool change performed by means of a tool changer device. The tool changer device comprises at least one automated guided vehicle, running on a shop floor and capable of lifting and lowering a tool by interaction with the tool changer interface of said tool, wherein a guide path for said at least one automated guided vehicle runs from outside and into said at least one sheet metal press through said opening. The
(Continued)

method comprises alternating use of a first and a second automated guided vehicle during a tool changing operation.

8 Claims, 7 Drawing Sheets

(51) Int. Cl.
  B21D 43/05   (2006.01)
  B23Q 3/155   (2006.01)
  B30B 15/02   (2006.01)
  B66F 9/06    (2006.01)

(52) U.S. Cl.
  CPC ........ B23Q 3/15573 (2013.01); B30B 15/028 (2013.01); B66F 9/063 (2013.01)

(56) References Cited

U.S. PATENT DOCUMENTS

| | | |
|---|---|---|
| 4,408,521 A | 10/1983 | Schelli et al. |
| 5,076,092 A | 12/1991 | Henderson et al. |
| 5,755,653 A * | 5/1998 | Nishida ................. B30B 15/028 483/1 |
| 2011/0151044 A1 | 6/2011 | Kato et al. |
| 2012/0174384 A1 * | 7/2012 | Leconte ................. B21D 53/78 72/428 |

OTHER PUBLICATIONS

Seyi Press, SEYI_Achievement_SDG Automatic Die Changing, https://www.youtube.com/watch?v=d8-x7bo3JZE (Year: 2017).*

AutoguidedVehicles, Forklift Automated Guided Vehicles (AGVs): Operation in Beverage Plant * Updated*, https://www.youtube.com/watch?v=gqmwl76qpGM (Year: 2016).*

Forwell Quick Die/Mold Change Systems, Quick die change system for press | QDC ダイセット | クイックダイチェンジ | Hizli kalip değiştirme sistemi | Forwell, https://www.youtube.com/watch?v=K6-XAN4CIEI (Year: 2016).*

International Search Report from International Application No. PCT/EP2018/084622, dated Jun. 7, 2019.

* cited by examiner

SHEET METAL PRESS SYSTEM AND METHOD USED IN CONNECTION THEREWITH

TECHNICAL FIELD

The present invention concerns a sheet metal press system comprising at least one sheet metal press having an opening through which a tool, comprising an upper die, a lower die and a tool changer interface, can pass during a tool change performed by means of a tool changer device. The present invention does further concern a method used in connection with such a sheet metal press system.

PRIOR ART

It is known for instance from US 2011/151044 A1 to perform a tool change by moving tools, which comprise an upper die, a lower die and a tool changer interface in the form of a bolster, on which the lower die is resting, into and out of a sheet metal press of a sheet metal press system by moving the bolster on rails. Outside the sheet metal press the rails lead to tool exchanging stations, which in their turn by means of stacker cranes are connected to tool receiving stations. Finally, automated guided vehicles, so- called AGVs, are used to deliver tools to and to pick up tools from the tool receiving stations.

OBJECT OF THE INVENTION

Although the prior art solution is versatile, it is rather complex and requires a lot of shop floor space and is to some extent limited in speed by the fact that each stacker crane has to serve a tool exchanging station of its own, from which station rails lead to several sheet metal presses. This is a major drawback especially in the so-called automotive industry, where frequent tool changes, high production rates and rather large press tools are common. In the light of this, it is an object of the present invention to provide a sheet metal press system which is versatile, quick and requires a minimum shop floor space and hence is well suited for the automotive industry.

And a further object of the present invention is to provide a method of operating such a sheet metal press system in an effective way.

BRIEF SUMMARY OF THE INVENTION

According to the present invention the first object is achieved by means of a sheet metal press system according to the preamble, said sheet metal press system being characterized in that the tool changer device comprises at least one automated guided vehicle, running on a shop floor and capable of lifting and lowering a tool by interaction with the tool changer interface of said tool, and that a guide path for said at least one automated guided vehicle runs from outside and into said at least one sheet metal press through said opening.

As the sheet metal press system according to the invention uses an automated guided vehicle to perform a tool change, the sheet metal press system is by far not as complex as the cited prior art solution. Further, it does not require the same large amount of shop floor space and is potentially quicker too, at least if, which is preferred, two alternatingly operated automated guided vehicles are used for each sheet metal press of the sheet metal press system.

According to another preferred embodiment, each automated guided vehicle comprises a tool docking bay, into which a tool fits. By adapting the automated guided vehicle and the tool to each other in such a way, interaction of the two is rendered easy and reliable.

According to another preferred embodiment, said docking bay comprises two parallel forks, having projecting dogs along sides facing each other, said dogs being capable of interaction with slots running along sides of a tool. Said dogs and rails render interaction even more easy and reliable and do so in an easy way.

Preferably, said dogs are liftable and lowerable in relation to said forks.

Such a solution is not as complicated as a solution would be that required the forks as such to be lifted.

Preferably, said tool changer interface forms an integral part of the lower die of a tool. Such a solution is advantageous as it minimizes the number of parts comprised in a tool, which is beneficial for instance when it comes to reliability.

According to an alternative embodiment, said tool changer interface comprises a bolster on which the lower die of a tool rests. Such a solution is useful for instance when smaller dies or temporary dies are used, for which a tool changer interface integrated in a lower die only would bring about unnecessary trouble or expenses.

The second object of the invention is achieved by means of a method used in connection with a sheet metal press system according the present invention, the method being characterized by the steps of using a first automated guided vehicle in a storage place to pick up a stored first tool, which comprises an upper die, a lower die and a tool changer interface, and to move the picked up first tool to a sheet metal press, of using a second automated guided vehicle in said sheet metal press to pick up a used second tool, which comprises an upper die, a lower die and a tool changer interface, and to move the picked up second tool out of the sheet metal press, of moving the picked up first tool into the sheet metal press by means of the first automated guided vehicle, of putting the picked up first tool down inside said sheet metal press, and of moving the first automated guided vehicle out of said sheet metal press.

By means of the method according to the invention, tool change can be performed in a sheet metal press of a sheet metal press system in a very versatile and quick way, wherein a tool to be used in a sheet metal press can be picked up at any desired place, such as a storage or maintenance place, and then be put down inside the sheet metal press without any time- consuming reloading, and wherein a tool used in a sheet metal press can be picked up inside the sheet metal press and then be moved to any desired place, such as a storage or maintenance place, again without any time-consuming reloading.

BRIEF DESCRIPTION OF THE DRAWINGS

In the drawings an embodiment of the sheet metal press system and the method according to the present invention is presented in a consecutive series of schematic perspective figures enumerated 1 to 14.

Description of an Embodiment

Figure 1:
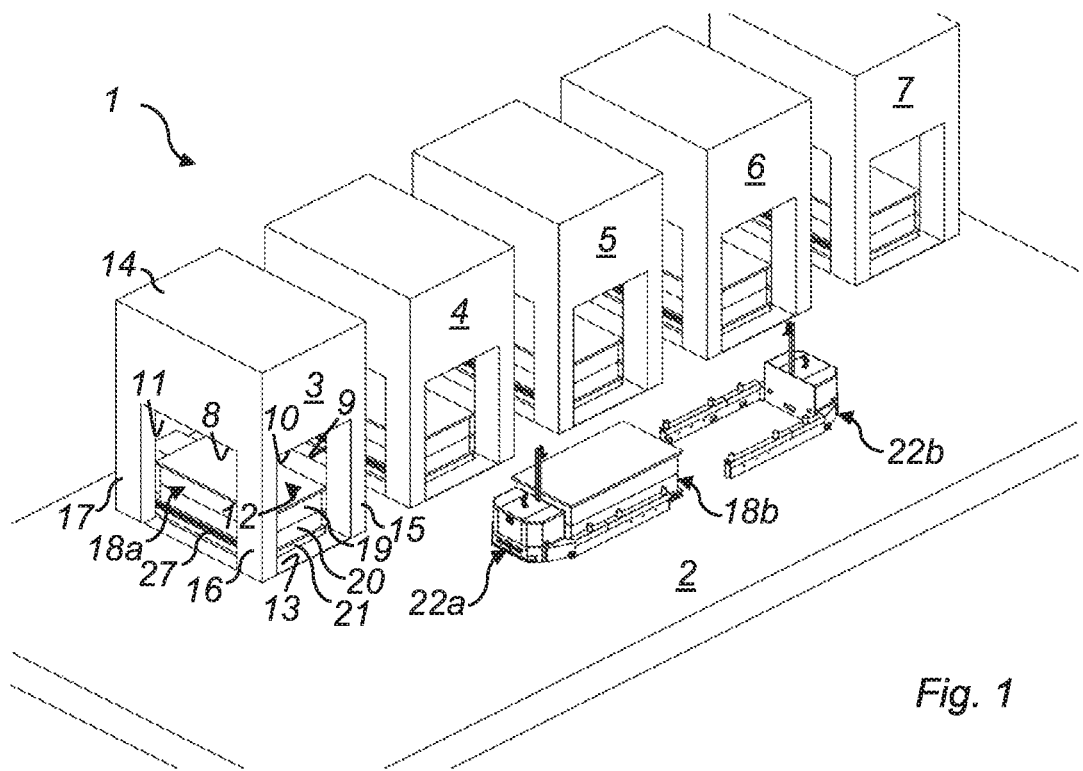
In FIGS. 1-14 identical reference numbers are used to depict identical features.

Further, reference numbers are used only where appropriate for explanatory purposes and are therefore not repeated in every figure.

In FIGS. 1-14 an identical portion of a pressing plant 1 is shown. It comprises a shop floor 2, on which an arbitrary number of identical sheet metal presses 3-7 are arranged in a row.

Each sheet metal press 3-7 has side openings, of which only a left side opening 8 and a right side opening 9 of the first sheet metal press 3 are depicted. The remaining sheet metal presses 4-7 have corresponding ones.

The side openings 8, 9 are used in a well-known manner during production to move work-pieces (not shown) into and out of each sheet metal press 3-7. Besides the side openings 8, 9 each sheet metal press comprises front and rear openings as well, of which only a front opening 10 and a rear opening 11 of the first sheet metal press 3 are depicted.

Inside each sheet metal press 3-7 there is a press chamber 12 (only the one in sheet metal press 3 is depicted), which is accessible through the side, front and rear openings 8-11. At the bottom the press chamber 12 is limited by a floor 13, which is in level with the shop floor 2, and at the top of a superstructure 14. The superstructure 14 is carried by four pillars, of which only the three visible ones 15-17 of sheet metal press 3 are depicted.

The superstructure 14 of each sheet metal press 3-7 does in a well-known and therefore not further described and shown way comprise at least one press cylinder, which for instance can be driven hydraulically and moves a press piston up and down during press operation.

During press operation the press piston is firmly connected to a press tool arranged inside the press chamber 12. In FIGS. 1-14 only press tools related to the press chamber 12 of the first sheet metal press 3 are depicted with reference numbers 18a and 18b and to some extent described, but their general structure is alike. Thus, each press tool 18a, 18b comprises a top die 19, which during press operation is moved up and down by at least one press piston, a bottom die 20 and a bolster 21, which carries the bottom die 20 and during press operation rests on the floor 13 of the press chamber 12.

Depending on a product to be produced by means of a sheet metal press 3-7, different press tools 18a, 18b are used. Hence, from time to time production has to be stopped and a tool change has to be performed. That situation is illustrated in FIGS. 1-14, which is why in these figures the at least one press piston mentioned above is disconnected from the upper die 19 of any press tool 18a, 18b inside any press chamber 12 and therefore not visible.

From a production point of view it is important both to minimize time of a tool change and to render tool change as flexible as possible in order to be able to cope with unexpected situations, such as a production change at short notice. Against that background, according to the present invention automated guided vehicles, so-called AGVs, come into play. In the figures two such AGVs are shown, a first one enumerated 22a and a second one enumerated 22b.

An AGV 22, 22b is self-propelled and usually runs directly on a shop floor. It is electronically controlled to follow a guide path exactly to an indicated destination. A guide path is usually not visible as it is defined by means of GPS-signals, optical way points, such as mirrors, and/or inductive means, such as an electrical cable embedded in a floor, which is why no paths are visible or depicted in FIGS. 1-14. The technique, however, is well known, and a person skilled in the art would therefore have no difficulties to apply the technique in the pressing plant 1 at hand.

The AGVs 22a, 22b shown in the figures are identical, which is why details of them are described in connection with appropriate figures only and unnecessary iterations of reference numbers are avoided generally.

In FIG. 1 all sheet metal presses 3-7 have been stopped and their press tools, such as press tool 18a of press 3, have their upper die 19 disconnected from the at least one press piston and resting directly on the lower die 20, whereas the lower die 20 in its turn is resting on the bolster 21 on the floor 13 of the press chamber 12. In front of the row of sheet metal presses 3-7 two AGSs 22a, 22b are shown on their way towards the first sheet metal press 3. The first AGV 22a carries a press tool 18b, which is a new or second tool intended to replace the old or first press tool 18a inside the first sheet metal press 3. The second AGV 22b is empty and does, as shown, preferably run in reverse compared to the first AGV 22a in order to shorten the distance travelled during a tool change.

Figure 2:
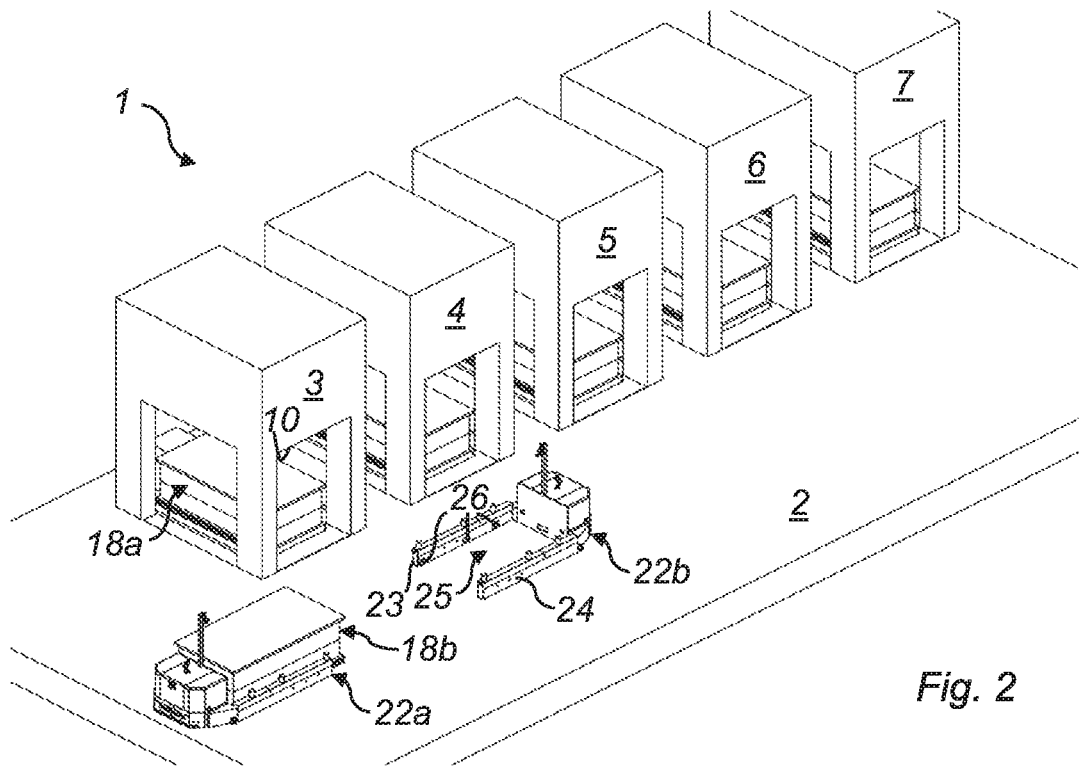

In FIG. 2 the first AGV 22a has just passed the first sheet metal press 3 and the second AGV 22b arrived at it. The second AGV 22b, clearly shown in the center of FIG. 2, comprises two parallel forks 23, 24, which in-between define a tool docking bay 25.

Both forks 23, 24 have on their sides facing each other dogs 26 (only the ones of fork 23 are visible, but the ones of fork 24 are alike), which are liftable and lowerable in relation to the forks 23, 24. The dogs 26 are capable of interaction with corresponding slots 27 running along sides of the bolster 21 of a press tool 18a, 18b. One such slot 27 is depicted on the bolster 21 of tool 18a in FIG. 1. A parallel one, however hidden in the figure, is arranged on the bolster 21 on the other side of the tool 18a.

Figure 3:
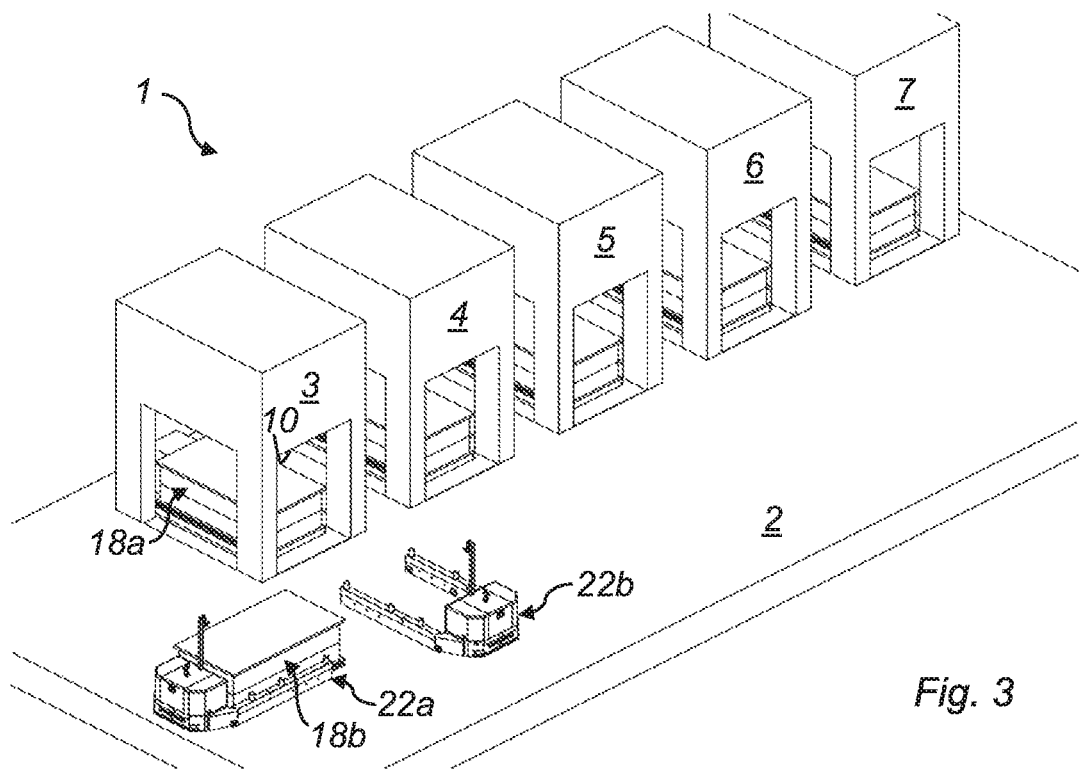

Now, as shown in FIG. 3, the second AGV 22b has turned towards the first sheet metal press 3 and is aligned with the front opening 10 of the sheet metal press 3.

Figure 4:
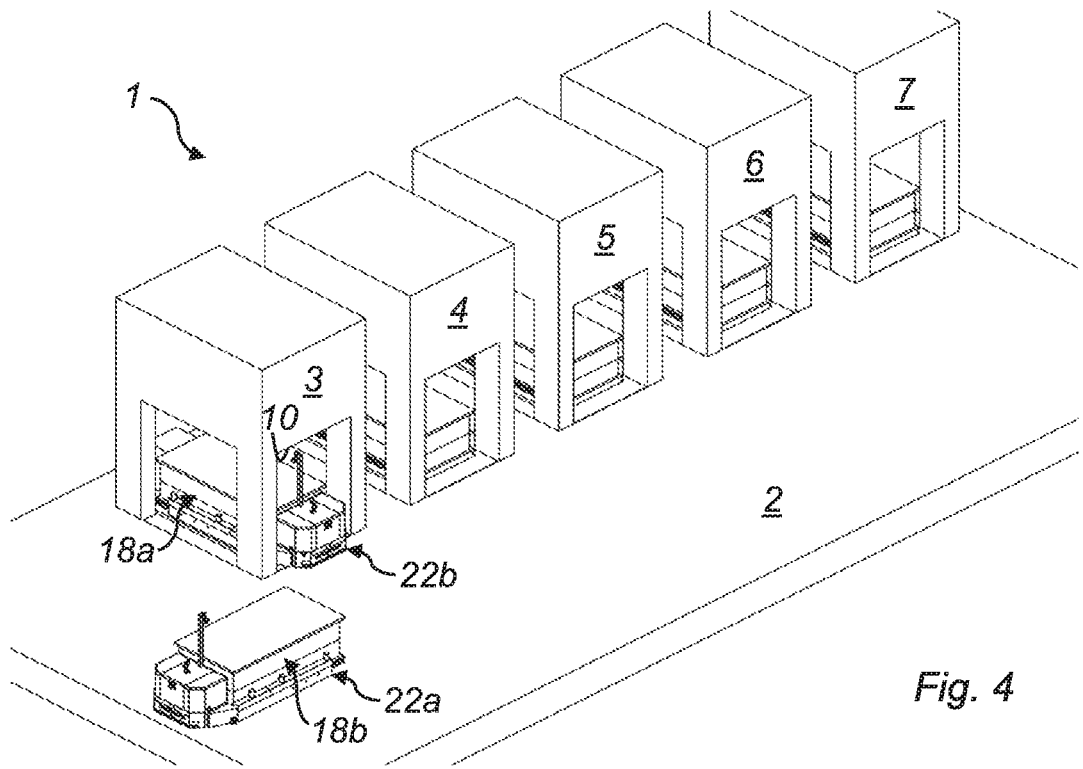

In the next step shown in FIG. 4, the second AGV 22b has moved into the first sheet metal press 3 through the front opening 10 and has run its forks 23, 24 along sides of the bolster 21 of tool 18a such that dogs 26 are inserted into the slots 27 of the bolster 21.

Figure 5:
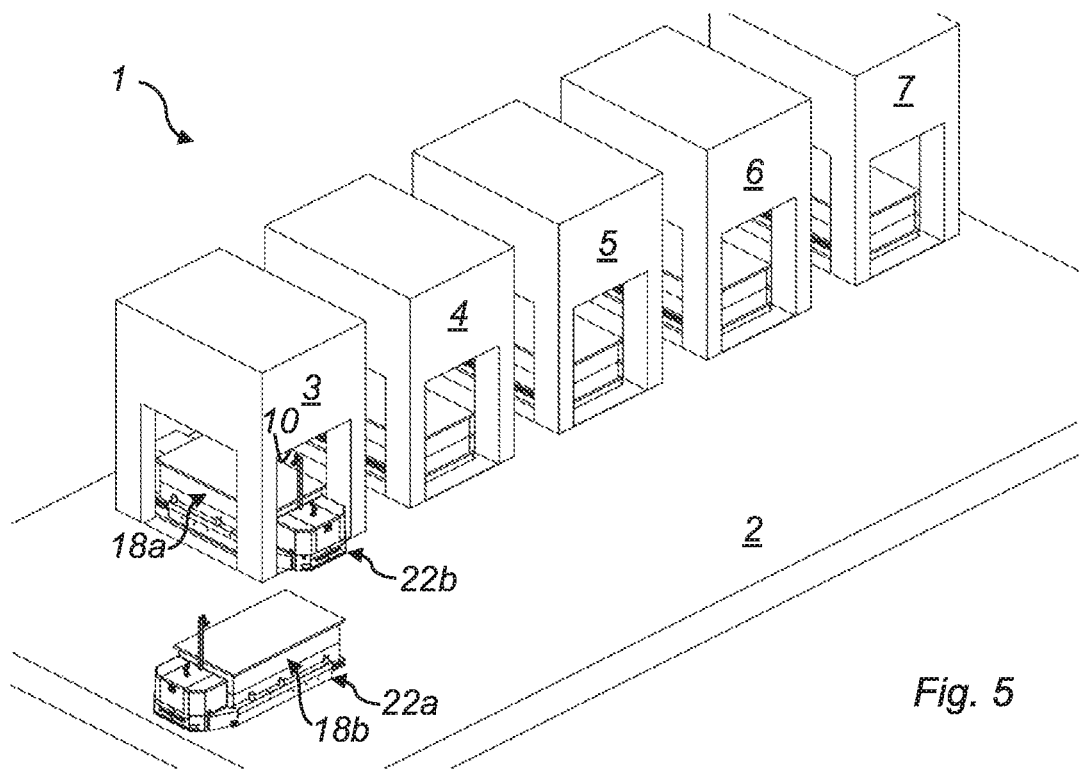

The next operational step is shown in FIG. 5 and comprises only of lifting tool 18a off the floor 13 of the press chamber 12 by lifting the dogs 26, which are engaged with said slots 27.

Figure 6:
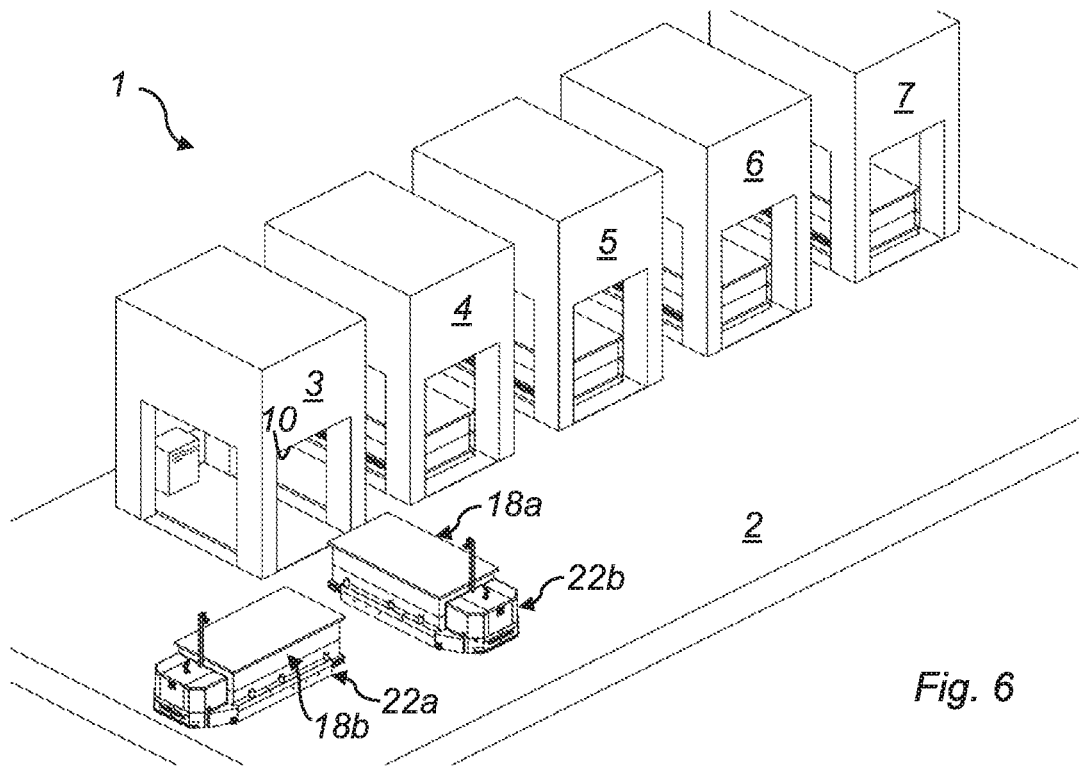
Figure 7:
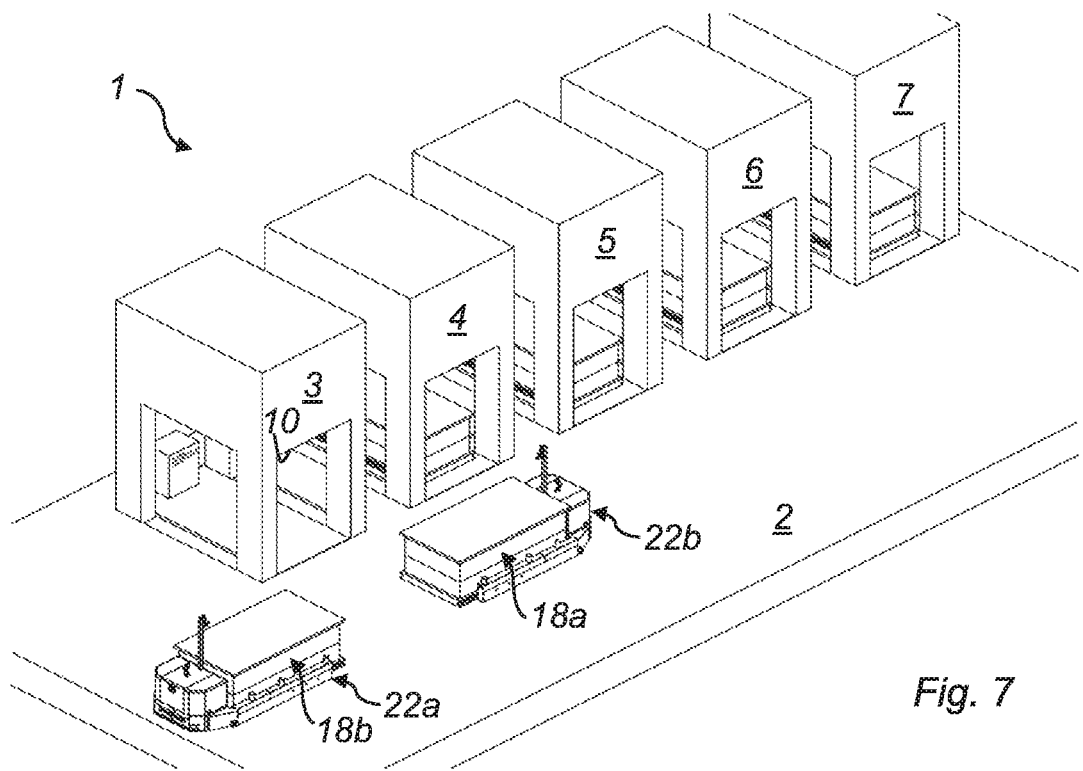

In FIG. 6 the second AGV 22b has moved the first press tool 18a through the front opening 10 out of the first sheet metal press 3. In FIG. 7 the second AGV 22b has turned away from the first sheet metal press 3 and the first AGV 22a, which is still waiting.

Figure 8:
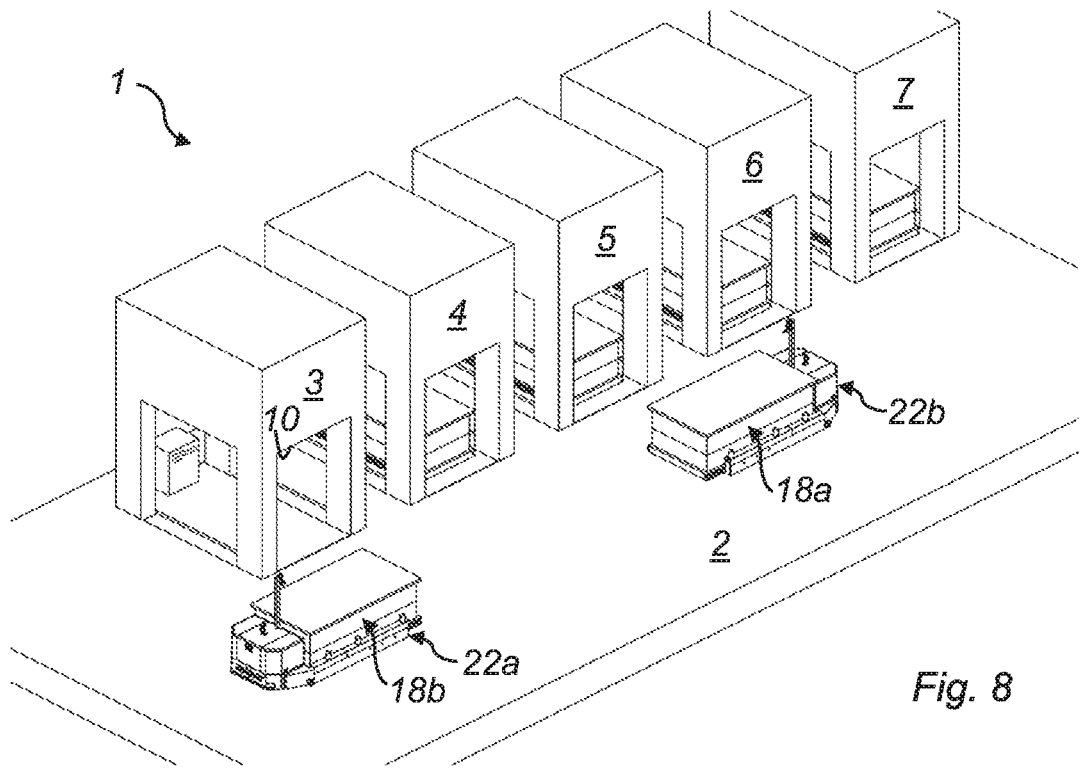

In FIG. 8 the second AGV 22b has moved further away and is on its way for instance towards a maintenance station, whereas the first AGV 22a has started to approach the first sheet metal press 3.

Figure 9:
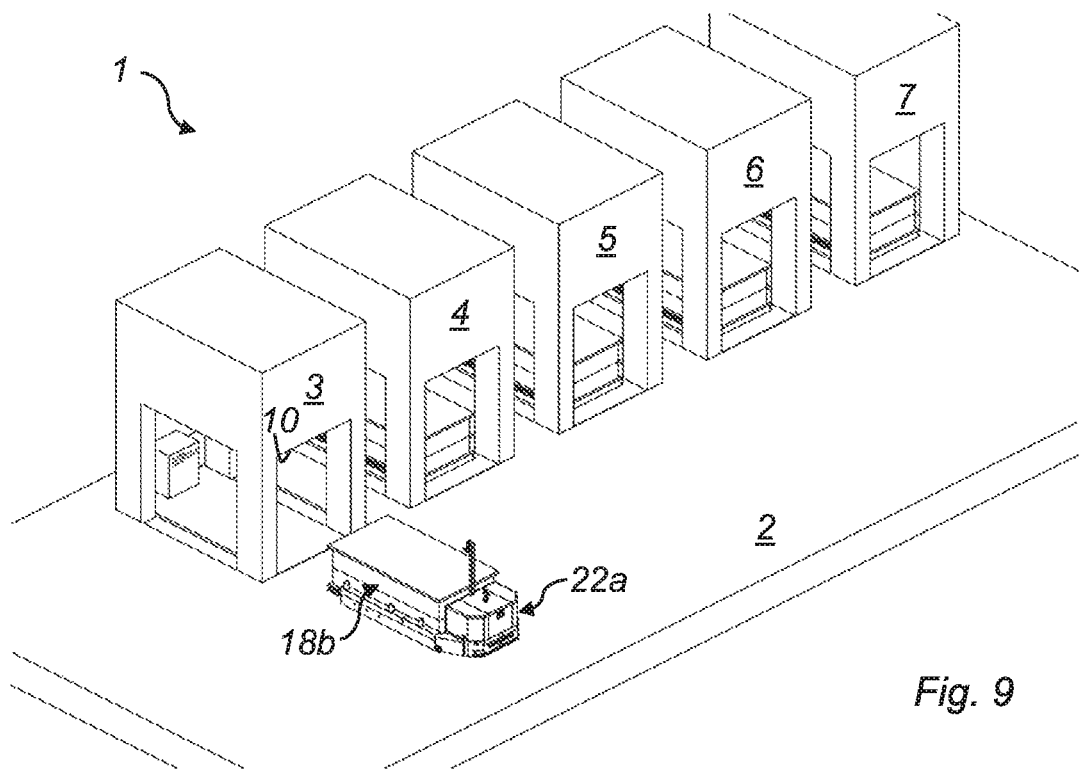

In FIG. 9 the first AGV 22a has turned towards the first sheet metal press 3 and has aligned itself with the front opening 10 of the sheet metal press 3.

Figure 10:
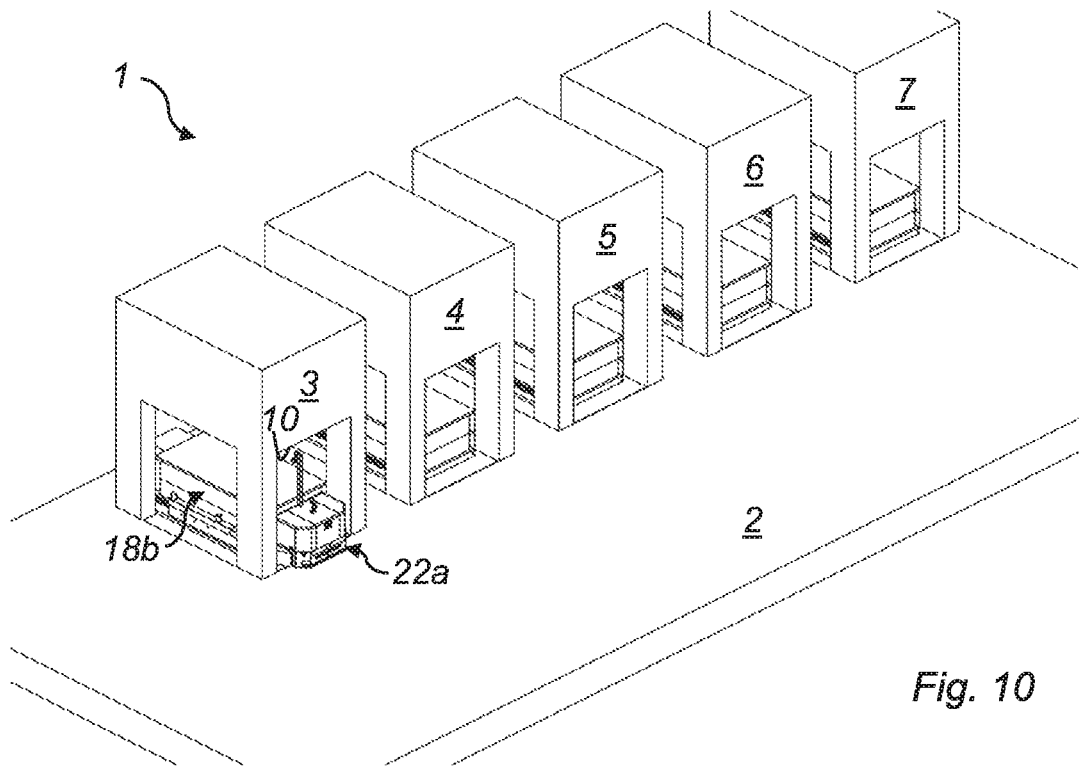

In the next step shown in FIG. 10, the first AGV 22a has moved into the first sheet metal press 3 through the front opening 10.

Figure 11:
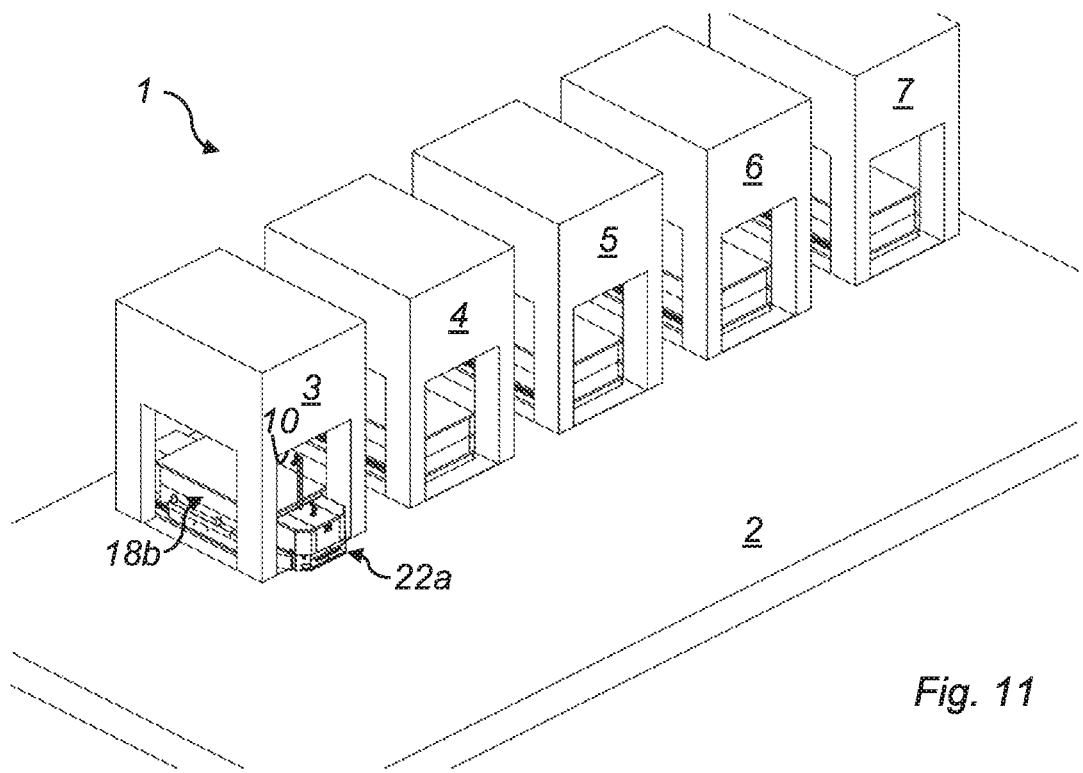

In FIG. 11 the first AGV 22a has by lowering its dogs 26 let the second press tool 18b down on the floor 13 inside the first sheet metal press 3.

Figure 12:
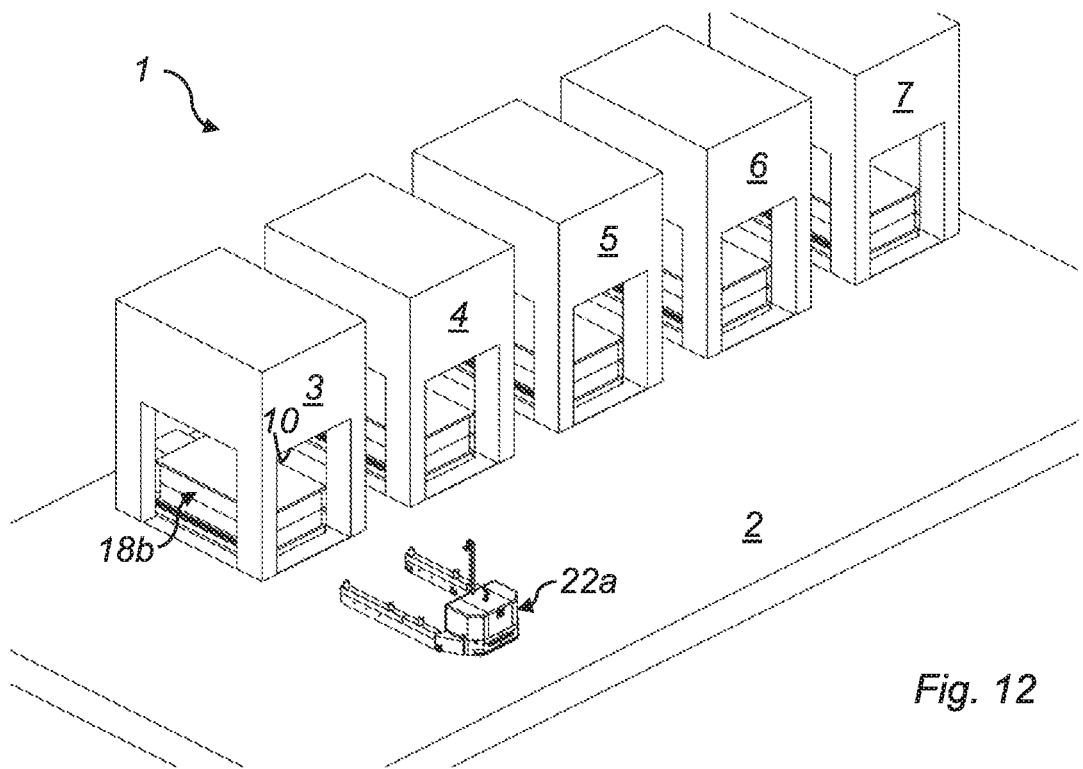
Figure 13:
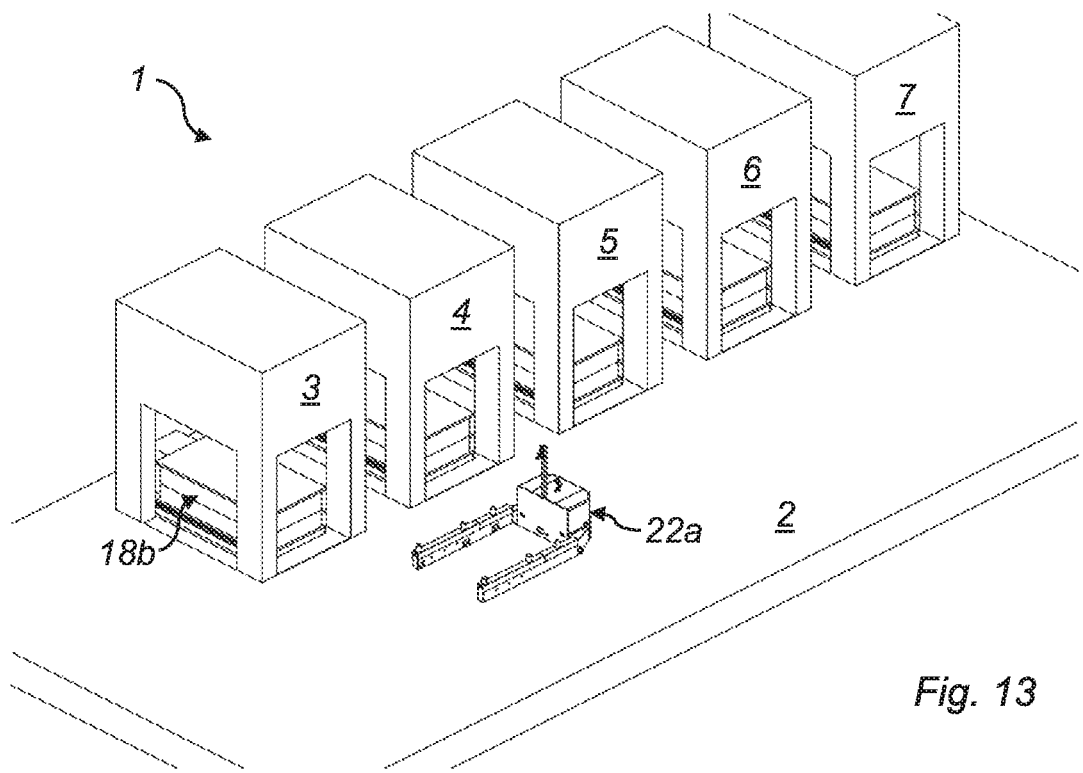
Figure 14:
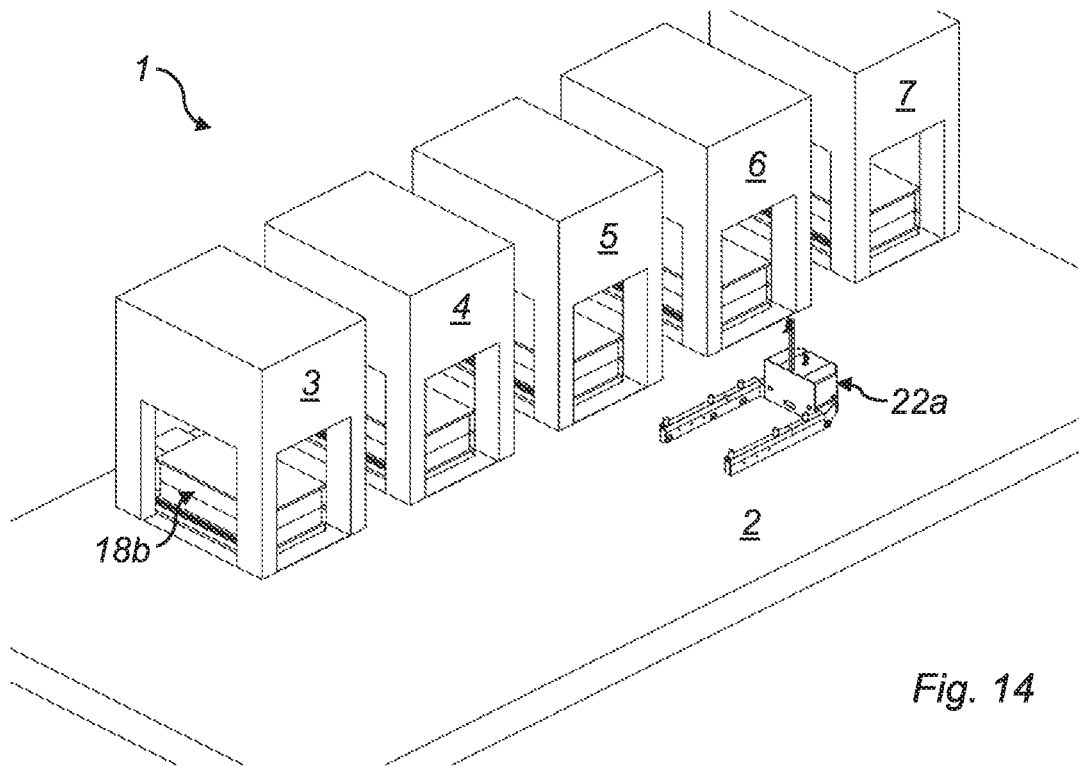

And, finally, in FIGS. 12-14 a sequence is shown in which the first AGV 22a in an empty state moves out of the first sheet metal press 3 and runs off along the row of sheet metal presses 3-7 for instance towards a press tool deposit.

A person skilled in the art realizes that the preferred embodiment described above can be altered in different ways within the scope of the appendant claims and that for instance the layouts of a sheet metal press, a tool or an AGV can differ.

However, the number of AGVs may differ as well. Thus, in order to maximize tool change speed, it is preferred to provide two AGVs per sheet metal press.

What is claimed is:

1. A sheet metal press system comprising;
   at least one sheet metal press having an opening;
   a tool including, an upper die, a lower die, and a tool changer interface; and
   a tool changer device including at least one automated guided vehicle running on a shoo floor along a guide path and capable of lifting and lowering the tool by interaction with the tool changer interface of the tool,
   wherein the tool can pass through the opening of the at least one sheet metal press during a tool change performed by the tool changer device, and
   wherein the guide path for the at least one automated guided vehicle runs from outside and into the at least one sheet metal press through the opening.

2. The sheet metal press system according to claim 1, wherein
   the at least one automated guided vehicle includes two alternatingly operated automated guided vehicles for each sheet metal press of the sheet metal press system.

3. The sheet metal press system according to claim 1, wherein each of the at least one automated guided vehicle includes a tool docking bay, into which the tool fits.

4. The sheet metal press system according to claim 3, wherein the docking bay includes two parallel forks, having projecting dogs along sides facing each other, the dogs being capable of interaction with slots running along sides of the tool changer interface of the tool.

5. The sheet metal press system according to claim 4, wherein the dogs are liftable and lowerable in relation to the forks.

6. The sheet metal press system according to claim 1, wherein the tool changer interface forms an integral part of the lower die of the tool.

7. The sheet metal press system according to claim 1, wherein the tool changer interface includes a bolster on which the lower die of the tool rests.

8. A method used in connection with a sheet metal press system comprising:
   using a first automated guided vehicle in a storage place to pick up a stored first tool, and move the picked up first tool to a sheet metal press having an opening,
      wherein the picked up first tool includes a first upper die, a first lower die and a first tool changer interface;
   using a second automated guided vehicle in the sheet metal press to pick up a used second tool, and move the picked up second tool out of the sheet metal press,
      wherein the picked up second tool includes a second upper die, a second lower die, and a second tool changer interface;
   moving the picked up first tool into the sheet metal press by the first automated guided vehicle,
      wherein the first automated guided vehicle runs on a shop floor along a guide path and is capable of lifting and lowering the stored first tool by interaction with the first tool changer interface, and
      wherein the guide path for the first automated guided vehicle runs from outside and into the sheet metal press through the opening;
   putting the picked up first tool down inside the sheet metal press; and
   moving the first automated guided vehicle out of the sheet metal press.

* * * * *